April 22, 1952 A. BOUWERS 2,593,724
MICROSCOPE WITH REFLECTING OBJECTIVE
Filed Dec. 19, 1945 2 SHEETS—SHEET 1
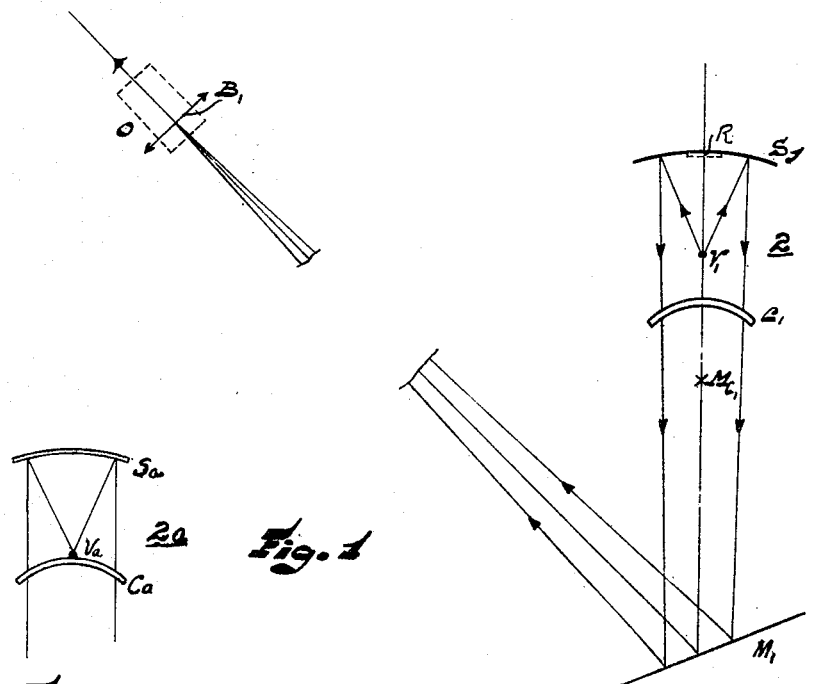
Fig. 1
Fig. 1a
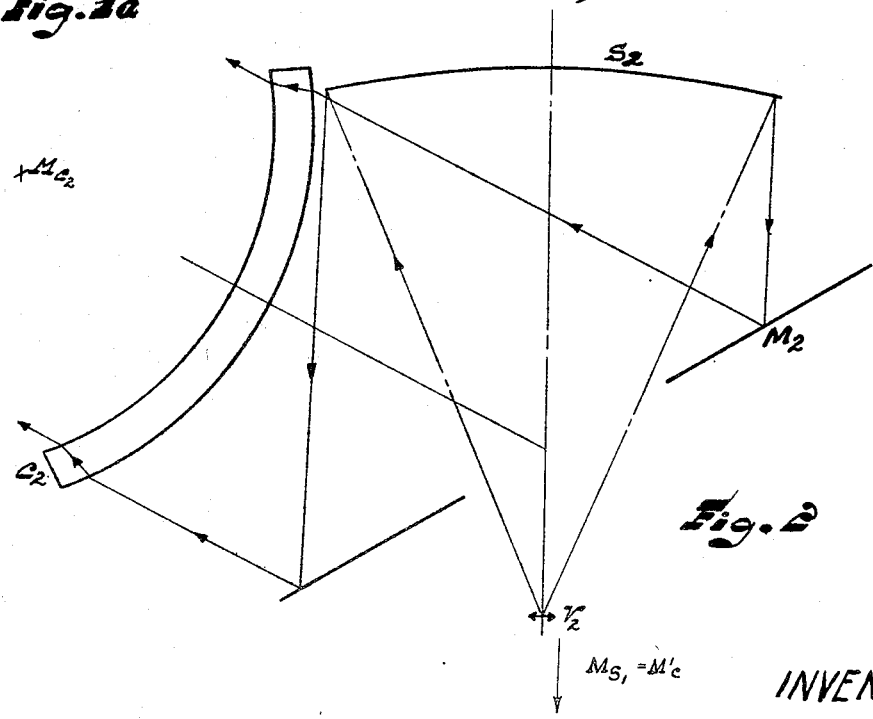
Fig. 2
INVENTOR
ALBERT BOUWERS
ATTORNEY

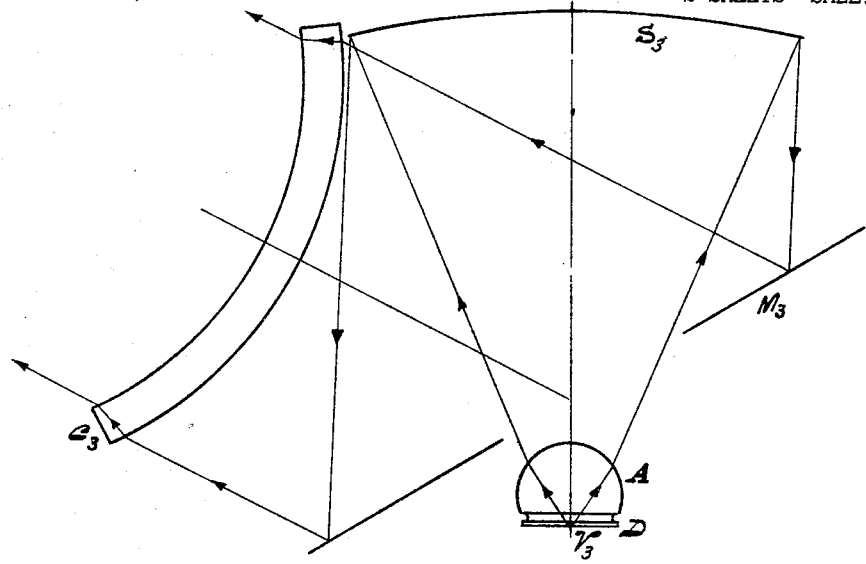
Fig. 3
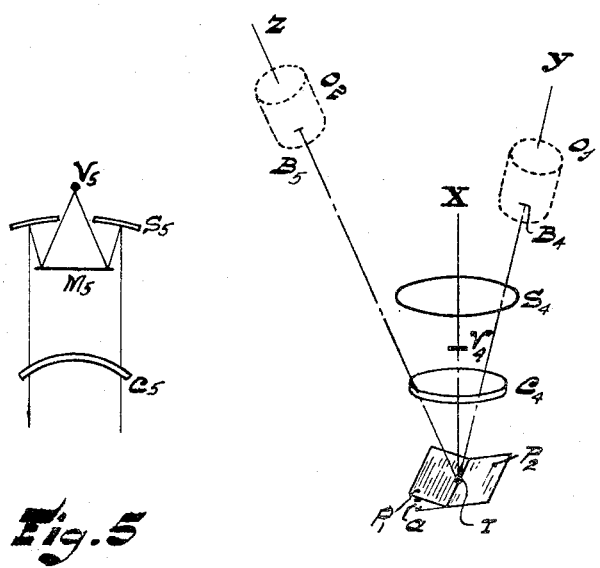
Fig. 5
Fig. 4

UNITED STATES PATENT OFFICE 2,593,724

MICROSCOPE WITH REFLECTING OBJECTIVE

Albert Bouwers, Delft, Netherlands, assignor to N. V. Optische Industrie "De Oude Delft," Delft, Netherlands Application December 19, 1945, Serial No. 635,985
In the Netherlands July 14, 1941

Section 1, Public Law 690, August 8, 1946
Patent expires July 14, 1961

22 Claims. (Cl. 88—39)

This invention relates to a microscope.

A microscopic objective has to meet with high requirements as to its definition. The latter should preferably be of the same order as the resolving power due to the diffraction. Secondly, a high resolving power due to the diffraction requires a large numerical aperture.

For high magnifications a large numerical aperture with great definition is therefore required in order that the resolving power due to the diffraction may in fact be applied to useful ends. This renders it necessary that the spherical and the chromatic aberrations and also the coma should be quite satisfactorily corrected.

The objective of microscopes hitherto in use is practically always constituted by lenses. In this case, the above-mentioned high definition-requirements can only be satisfied by an involved lens system. According to the invention, these definition-requirements can be met in a very simple manner. The microscope according to the invention is characterized by using in the objective a spherical mirror provided with a correcting element. This correcting element removes the spherical and comatic aberrations of the mirror. The mirror is free from chromatic aberrations so that the system of spherical mirror and correcting element is only possessed of low chromatic aberration which can be readily removed. Such a mirror system is already known per se, for example from the Schmidt camera for astrophotography. Novel, however, it is use in a microscope in which a simple system of this kind can be used as the objective or, for high magnifications, as a part of the objective.

An advantage of the microscope according to the invention is that the number of elements from which the objective is built up is considerably smaller than with the microscope objectives hitherto in use. Thus, the mechanical centering of the said elements relatively to each other, which is difficult on account of the high precision here required, is greatly facilitated.

If only a mirror system is used as the objective the numerical aperture is limited by the maximum relative aperture for which a mirror system can be used without the definition becoming exceedingly low and in addition by the fact that immersion cannot be made use of. If for the relative aperture the value of, say, 1:1 is taken the numerical aperture is about 0.5. The resolving power resulting therefrom may, however, in the case of screening the centre of the spherical mirror, be higher than with the objectives hitherto in use.

For very high magnifications the use of the mirror system alone does not suffice. In this case it is necessary for the aperture of the image-forming beams, which, for an object close to the objective, is much larger than 1:1 to be reduced, for example, to 1:1.2. According to one suitable embodiment of the invention this may be effected by placing an aplanatic or substantially aplanatic lens or lens-system—such as the front lens of a microscope objective hitherto in use for high magnifications—in front of the mirror so that an image of the object is formed by this aplanatic lens or the aplanatic lens-system near the focal point of the mirror system.

The advantage of this objective construction over the construction already known is that the objective part at the back of the aplanatic lens or the aplanatic lens system is again much simpler than in the objectives already known.

The chromatic aberration due to the front lens can be corrected in the correcting element of the spherical mirror or in the ocular. These two methods may be used at the same time. In addition, the chromatic aberration in the front lens may be reduced by making it of fluorite.

According to the invention, if the objective is only constituted by the mirror system it may be desirable that the correcting element should be made of fluorite.

The center of the spherical mirror is practically always inactive since the object, the object carrier and sometimes also the illuminating system throw a shadow. This involves a certain loss of light but has the advantage that the diffraction figure is more sharply defined and the resolving power is increased. According to the invention, it may even be of particular service to increase the screening of the center of the mirror for this reason. This gives the additional advantage that correction is only required for the active outer zone of the spherical mirror with the result that the latter may be more perfect than if the entire mirror were active.

Microscopes according to the invention in which the objective is only constituted by the mirror system have the additional advantage of a large free object distance over the well-known microscopes for the same magnification of the objective.

A favorable form of construction of the microscope according to the invention is obtained by placing a plane or a slightly curved spherical mirror or a reflecting prism in the path of the rays between objective mirror and ocular.

The arrangement of such a mirror or such a prism in the path of the rays between objective mirror and ocular has the advantage of permitting the ocular and the eye placed at the back thereof to be moved to any desired point by varying the position of the mirror and its distance from the objective. Thus, for example, according to the invention the optical tube length (the distance from the focal point of the objective to the focal plane of the eye-piece) and the position of the mirror may be such that the eye placed at the back of the ocular is spaced a proper distance from convenient direct observation of the preparation under view, without the aid of the microscope, the eye being preferably located substantially in a horizontal plane which is as high as or higher than the horizontal plane passing through the preparation.

According to the invention, it may be necessary for given uses that the plane or the slightly curved spherical mirror or the reflecting prism should have an aperture which transmits the light received from the object (or from the image formed thereof by the first objective part). This light is then successively reflected on the objective mirror and on the plane or the slightly curved spherical mirror or the reflecting prism and eventually passes through the correcting element. With this arrangement the size of the object is not limited and the illuminating system need not be small.

According to a further form of construction of the microscope according to the invention the spherical objective mirror has an aperture formed in the reflecting surface and a plane or slightly curved spherical mirror is arranged in the path of the rays between the object placed at the back of the objective mirror and the objective mirror itself, the said plane or the said slightly curved spherical mirror being substantially normal to the optical axis of the objective mirror. The light from the object (or from the image formed thereof by the first objective part) passes through the central aperture in the objective mirror, is then successively reflected on the plane or the slightly curved spherical mirror and eventually passes through the correcting element. With this arrangement, object and illuminating system are again not bound by a given size.

In those forms of construction of the microscope according to the invention in which neither the plane nor the slightly curved spherical mirror nor the reflecting prism nor the objective mirror has an aperture, it is necessary for precautions to be taken to minimize shadow effects of illuminating system, screening glass and object glass. This may be effected, for example, by minimizing the size of the illuminating system, the object glass and the screening glass itself. A further expedient consists in arranging the illuminating system in such manner that it falls entirely outside the objective, for example an annular condenser, in which the plane of the ring is normal to the optical axis of the objective mirror and which concentrates its light in the object. In this way a so-called dark field illumination is obtained.

According to the invention, by arranging for the object plane of the microscope substantially to coincide with the side of the correcting element that is adjacent the mirror it is possible for the said correcting element also to act as the object glass. In this case, the illumination of the object is effected across the correcting element.

According to a preferred form of construction of the microscope according to the invention, the correcting element has only spherical or plane circumscribing surfaces. In order to render the field large it is preferable that one or both of the outer surfaces of the correcting element should be entirely or substantially concentric with the mirror surface, the term "concentric surfaces" being understood to mean not only those surfaces whose centers of curvature coincide themselves but also forms of construction in which the center of curvature of the spherical objective mirror coincides with the image of the center of curvature of the circumscribing surfaces of the correcting element formed by a plane mirror arranged in the path of the rays.

According to a further form of construction of the microscope according to the invention a simple alteration of the microscope according to the invention in which a plane mirror or a reflecting prism is used renders it possible to make the instrument suitable for binocular observation.

In a binocular microscope in which one objective is used the image which the objective forms of the object must generally be split up into two images which are each viewed by means of an ocular.

This may be effected by dividing the exit pupil of the microscope objective into two halves and by passing the light received from the first half of the exit pupil to one of the oculars and the light received from the second half of the exit pupil to the second ocular.

With microscopes of the usual construction a disadvantage inherent in this method is that the exit pupil of the objective in those microscopes is arranged close to or in the objective. In the latter case, which always occurs with comparatively high magnifications, this method is therefore quite unserviceable.

A further disadvantage inherent in this method with microscopes of the usual construction is that in order to obtain a correct stereoscopic effect (orthoscopic viewing) it is necessary for the light beams separated close behind the objective to be caused by means of a supplementary additional optical device to be inclined to each other between the objective and the ocular in such manner that the light received from the left hand half of the exit pupil of the objective strays into the right hand ocular and vice versa. By adopting the method according to this embodiment of the invention both difficulties are removed.

The microscope according to this embodiment of the invention is characterized in that the plane mirror which it comprises or one of the active surfaces of the reflecting prism is split up into two parts which form a small angle having a maximum value of 20° with each other, the arrangement being such that the microscope is suitable for binocular observation, the expression "angle between two mirrors" being understood to mean an angle of rotation which is generated when, the plane mirror (or the plane active surface of a prism) being used as a basis, a part of the plane mirror is rotated about an axis in the mirror plane away from the original mirror plane.

Since with a microscope according to the invention the exit pupil of the objective is located outside the objective, in contra-distinction to the microscopes in use, even with high magnifications of the microscope splitting up of the image-forming light beams as required for binocular observation, can occur at the theoretically correct point, i. e. in the exit pupil of the objective. A second advantage of the microscope according to this embodiment is that the relative inclination of the light beams, as required for orthoscopic viewing, is obtained without any supplementary optical device.

The angle between the two mirrors may be chosen in such manner that the image formed by the objective and one of the parts of the plane mirror and the image formed by the objective and the other part of the plane mirror have the proper angular separation.

According to the invention, care is in addition preferably taken that the central rays of the two light beams which emerge from the two halves of the plane mirror or from the active surface of the reflecting prism form an angle with each other which corresponds to the angle normally occurring between the optical axes of the two eyes. In this way strain of the eyes is avoided.

In order that the invention may be clearly understood and readily carried into effect it will now be described more fully with reference to the following examples and the accompanying drawing.

Fig. 1 is a schematic diagram of a microscope according to one embodiment of the invention wherein the objective comprises a spherical mirror and a refractive correcting element;

Fig. 1a is a schematic diagram of another embodiment of the invention in which only the objective of the microscope is illustrated, and wherein the refractive correcting element is also utilized as an object glass;

Fig. 2 is a schematic diagram of another embodiment of the invention utilizing a spherical mirror in the objective of the microscope and a plane mirror having an aperture;

Fig. 3 is a schematic diagram of a third embodiment of the invention wherein the objective of the microscope comprises an aplanatic lens, a spherical mirror, and a correcting element, and wherein the object to be viewed is shown immersed in a liquid of suitable refractive properties;

Fig. 4 is a schematic diagram of still another embodiment of the invention in which the microscope is adapted for binocular vision; and Fig. 5 is a schematic diagram of still another embodiment of the invention wherein an apertured spherical mirror is employed.

In Fig. 1, $V_1$ designates the object, $B_1$ the image, $S_1$ the spherical objective mirror, $M_1$ the apertured plane mirror, $C_1$ the correcting element and O the ocular.

In the first example (Fig. 1), the focal length of the objective 2 and the optical tube length are 2 cms. and 30 cms. respectively. The natural magnification of the objective is thus 15×. The total magnification of the microscope is thus increased to 150×, if 10× oculars are used. The numerical aperture is 0.40. The correcting element $C_1$ is of fluorite. In this example the distance of the eye from the object to be viewed is about 25 cms. The spherical circumscribing surfaces of the correcting element $C_1$ and the active surface of the mirror $S_1$ have their center of curvature at $M_{c_1}$. The central surface region R of the mirror $S_1$ is non-reflecting, to avoid shadow effects.

In the schematic diagram of Fig. 1a the meniscus correcting element $C_a$ is arranged so that the object to be viewed $V_a$ is placed directly on the side adjacent the spherical mirror $S_a$. The entire objective $2_a$ may then be utilized, for example, in place of the objective 2 of Fig. 1. It will be understood that the correcting element $C_a$ may then have curvatures calculated in a different manner and may also have a different thickness from that of the correcting element $C_1$ of Fig. 1.

In the second example (Fig. 2) the focal length of the objective and the tube length are 2 and 40 cms. respectively so that the natural magnification of the objective becomes 20×. The total magnification of the microscope is thus increased to 400×, if 20× oculars are used. The numerical aperture is 0.40. The correcting element is of fluorite and has spherical circumscribing surfaces. These surfaces have their common center of curvature at $M_{c_2}$. The spherical mirror $S_2$ has its center of curvature at $M_{s_1}$. Nevertheless the spherical circumscribing surfaces of the correcting element $C_2$ and the spherical mirror $S_2$ are concentric in the sense of the invention because the image $M'_c$ of $M_{c_2}$ in the plane mirror $M_2$ coincides with $M_{s_1}$. This latter condition is indicated in the figure by the sign: $M_{s_1} \equiv M_c'$. Light from the object $V_2$ reaches mirror $S_2$ through the aperture in the plane mirror $M_2$.

In the third example (Fig. 3) the natural magnifications of the objective mirror $S_3$ and of the aplanatic lens A are 15× and 2× respectively; that of the entire objective is thus increased to 30× and that of the entire microscope to 600×, if 20× oculars are used. The aplanatic lens A is made of fluorite. The object $V_3$ is immersed in a suitable liquid enclosed by the lens A and plate D. The numerical aperture is 0.80. The correcting element $C_3$ is made of heavy flint and comprises spherical circumscribing surfaces. The centers of curvature of these surfaces and that of the mirror $S_3$ do not coincide with each other. Plane mirror $M_3$ is apertured as shown so that light passes from the object to the spherical mirror through the aperture.

Fig. 4 shows one form of construction of the microscope according to the invention in which the instrument is adapted for binocular observation. The objective shown is constituted by a spherical mirror $S_4$ and the correcting element $C_4$ whose function is to correct the aberrations of the mirror $S_4$. The objective has for its optical axis TX. The object under view is $V_4$. At the area of the exit pupil of the objective is arranged, according to this embodiment of the invention, the mirrors $P_1$ and $P_2$ which may be considered as a single plane mirror split into two parts which form the angle $a$ with each other. This mirror form is generated by subdividing an originally plane mirror into the parts $P_1$ and $P_2$ and by then rotating the part $P_1$ through the angle $a$ relatively to the part $P_2$. Two images $B_4$ and $B_5$ of the object $V_4$ are formed by the objective and the mirrors $P_1$ and $P_2$ in the focal planes of the oculars $O_1$ and $O_2$. The optical axes of these oculars are designated TY and TZ. The three illustrated optical axes TX, TY and TZ intersect each other at the point T which is located on the line of demarcation of the mirror parts $P_1$ and $P_2$. If the microscope is used normally the axis TX is vertical and the plane passing through the axes TY and TZ is sloped forwardly so that an agreeable attitude for the observer is obtained.

The angle ZTY is preferably chosen to be substantially equal to the angle which the optical axes of the accommodated eyes of an observer normally form with each other.

The distance between one of the eyes of the observer and the object located at the area of $V_4$ is preferably chosen to permit easy direct observation of the object.

In the schematic diagram of Fig. 5, a spherical mirror $S_5$ is centrally apertured as shown. The object $V_5$ to be viewed is placed behind the aperture and a plane or only slightly curved mirror $M_5$ is placed in front of the mirror with its reflecting surface facing the concave reflecting surface of spherical mirror $S_5$. Light passes from object $V_5$ to mirror $M_5$ through the aperture and is reflected thence to the concave spherical reflecting surface of mirror $S_5$, whence it is again reflected and passes through the refractive correcting element $C_5$ which is calculated to correct for the spherical aberration introduced by the mirror. The objective thus formed may be used, as will be apparent, in any of the illustrated embodiments with suitable alterations.

What I claim is:

1. A binocular microscope for viewing an object, comprising an objective, an optical element having two plane intersecting reflecting surfaces and two oculars, said objective comprising a spherical concave mirror and a refractive spherical-aberration correcting element substantially correcting by refraction the spherical aberration of said mirror and having only substantially spherical refractive surfaces, said objective and said oculars having optical axes meeting each other in a point located on the line of intersection of said plane reflecting surfaces, each of said plane reflecting surfaces being normal to the bisectrix of the angle between said optical axis of the objective and said optical axis of one of said oculars, said object being positioned near the focal point of said objective, the effective light rays emanating from said object being successively reflected at said mirror, refracted by said correcting element and reflected at one of said two reflecting surfaces towards the focal point of one of said oculars.

2. A binocular microscope as claimed in claim 1, said two reflecting surfaces forming a small angle with each other and being arranged substantially at the exit pupil of said objective.

3. A microscope for viewing an object, comprising an objective, an optical element having a plane reflecting surface and an ocular, said objective comprising a concave spherical first surface mirror and a refractive spherical-aberration correcting element spaced therefrom and substantially correcting by refraction the spherical aberration of said mirror, said correcting element comprising a meniscus lens having only substantially spherical refractive surfaces, said correcting element being concave towards the center of curvature of said spherical mirror, said objective and said ocular having optical axes which intersect each other in a point on said plane reflecting surface, said plane reflecting surface being positioned to redirect light rays to said ocular for convenient viewing, the object plane being positioned near the focal point of said objective, the effective light rays emanating from the object being successively, along the optical axis of said microscope, reflected at said mirror, refracted by said correcting element and reflected at said plane reflecting surface towards the focal point of said ocular.

4. A microscope for viewing an object, comprising an objective, an optical element having a plane reflecting surface and an ocular, said objective comprising a concave spherical first surface mirror and a refractive spherical-aberration correcting element spaced therefrom and substantially correcting by refraction the spherical aberration of said mirror, said correcting element comprising a meniscus lens having only substantially spherical refractive surfaces, at least one of said surfaces being concentric with said spherical mirror, said objective and said ocular having optical axes which intersect each other in a point on said plane reflecting surface, said plane reflecting surface being positioned to redirect light rays to said ocular for convenient viewing, the object plane being positioned near the focal point of said objective, the effective light rays emanating from the object being successively, along the optical axes of said microscope, reflected at said mirror, refracted by said correcting element and reflected at said plane reflecting surface towards the focal point of said ocular.

5. In a microscope as claimed in claim 3, and wherein the said correcting element comprises a single meniscus lens.

6. In a microscope as claimed in claim 3, and wherein the said correcting element is an achromatized meniscus lens.

7. In a microscope as claimed in claim 3, and wherein said correcting element comprises a meniscus lens which is convex towards said spherical mirror, the distance along the optical axis between said meniscus lens and said spherical mirror being smaller than the radius of curvature of said mirror.

8. In a microscope as claimed in claim 3, and wherein said correcting element comprises a meniscus lens having boundary surfaces, both said boundary surfaces having their center of curvature in the center of curvature of said spherical mirror.

9. In a microscope as claimed in claim 3, and including an additional lens system on the optical axis of said microscope to produce a virtual image of the object at a point near the focal point of said objective.

10. In a microscope as claimed in claim 3, and including an additional immersion lens system on the optical axis of said microscope to produce a virtual image of the object at a point near the focal point of said objective.

11. A microscope for viewing an object comprising an objective, an optical element having a plane reflecting surface and an ocular, said objective comprising a concave spherical first surface mirror and a refractive spherical-aberration correcting element spaced therefrom and substantially correcting by refraction the spherical aberration of said mirror, said correcting element comprising a meniscus lens having only substantially spherical refractive surfaces, said correcting element being concave towards the center of curvature of said spherical mirror, said correcting element and said spherical mirror having optical axes which intersect each other in a point on said reflecting surface, said optical element having a hole therethrough, the object plane being positioned near the focal point of said objective which point is located on the optical axis of said mirror, said plane reflecting surface being positioned to redirect light rays to said ocular for convenient viewing, the effective light rays emanating from said object along the optical axis of said microscope travelling through said hole in said optical element, being reflected successively at said concave spherical mirror and said plane reflecting surface and being refracted through said correcting element towards the focal point of said ocular, said correcting element, said spherical mirror and said plane reflecting surface being so spaced that the center of curvature of the spherical mirror coincides with the image of the center of curvature of the refractive surfaces of the correcting element formed by the plane reflecting surface.

12. In a microscope as claimed in claim 11, and wherein the said correcting element comprises a single meniscus lens.

13. In a microscope as claimed in claim 11, and wherein the said correcting element is an achromatized meniscus lens.

14. In a microscope as claimed in claim 11, and wherein said correcting element comprises a meniscus lens which is convex towards said reflecting surface of said optical element, the sum of the distances along the optical axis from said meniscus lens to said reflecting surface and from said reflecting surface to said mirror being smaller than the radius of curvature of said mirror.

15. In a microscope as claimed in claim 11, and wherein the said correcting element comprises a meniscus lens having boundary surfaces, both said boundary surfaces having their center of curvature in a common point, the sum of the distances along the optical axis from said common point to said point of intersection of said optical axes of said correcting element and said mirror and from said point of intersection to the vertex of the surface of said concave mirror being substantially equal to the radius of curvature of said surface of said concave mirror.

16. In a microscope as claimed in claim 11, and including an additional lens system on the optical axis of said microscope to produce a virtual image of the object at a point near the focal point of said objective.

17. In a microscope as claimed in claim 11, and including an additional immersion lens system on the optical axis of said microscope to produce a virtual image of the object at a point near the focal point of said objective.

18. A microscope for viewing an object, comprising an objective and an ocular, said objective comprising a concave spherical first surface mirror having a central hole therethrough, a spherical convex mirror spaced from said concave mirror with its reflective surface facing said concave mirror and having a diameter which is substantially smaller than the diameter of said concave mirror, and a refractive spherical-aberration correcting element comprising a meniscus lens substantially correcting by refraction the spherical aberration of the combination of said concave mirror and said convex mirror, said correcting element being spaced from said mirrors and having only substantially spherical refractive surfaces, said correcting element being concave towards the center of curvature of said concave spherical mirror, the object plane being positioned near the focal point of said objective, the effective light rays emanating from the object along the optical axis travelling through said hole in said concave mirror and being successively reflected at said convex mirror, reflected at said concave mirror and refracted by said correcting element towards the focal point of said ocular.

19. In a microscope as claimed in claim 18, and wherein the said correcting element comprises a single meniscus lens.

20. In a microscope as claimed in claim 18, and wherein the said correcting element comprises an achromatized meniscus lens.

21. In a microscope as claimed in claim 18, and wherein the said correcting element comprises a meniscus lens which is convex towards said concave mirror and being positioned at a distance from said concave mirror which is smaller than the radius of curvature of said concave mirror.

22. A microscope for viewing an object, comprising an objective, an optical element having a plane reflecting surface and an ocular, said objective comprising a concave first surface spherical mirror and a refractive correcting element spaced therefrom, said correcting element comprising a meniscus lens having only substantially spherical refractive surfaces, at least one of said surfaces being concentric with said spherical mirror, said objective and said ocular having optical axes which intersect each other in a point on said plane reflecting surface, said plane reflecting surface being positioned to redirect light rays to said ocular for convenient viewing, the object plane positioned near the focal point of said objective, the effective light rays emanating from the object being successively, along the optical axis of said microscope, reflected at said mirror, refracted by said correcting element and reflected at said plane reflecting surface towards the focal point of said ocular.

ALBERT BOUWERS.

REFERENCES CITED

The following references are of record in the file of this patent:

UNITED STATES PATENTS

| Number | Name | Date |
|---|---|---|
| 214,501 | Fritsch | Apr. 22, 1879 |
| 426,869 | Simon | Apr. 29, 1890 |
| 1,650,646 | Ott | Nov. 29, 1927 |
| 1,853,674 | Englemann | Apr. 12, 1932 |
| 1,967,214 | Acht | July 24, 1934 |
| 1,972,019 | Kanolt | Aug. 28, 1934 |
| 2,141,884 | Sonnefeld | Dec. 27, 1938 |
| 2,156,911 | Brown | May 2, 1939 |
| 2,170,979 | Straubel | Aug. 29, 1939 |
| 2,218,270 | Snook | Oct. 15, 1940 |

FOREIGN PATENTS

| Number | Country | Date |
|---|---|---|
| 149,636 | Great Britain | Dec. 23, 1920 |
| 548,750 | Great Britain | Oct. 22, 1942 |

OTHER REFERENCES

Hendrix et al. article, "Telescoptics," in Scientific American, published by Munn & Co., New York, New York, August 1939, pages 118 to 123. (Photocopy of article in Division 7.)